US008650426B2

(12) United States Patent
Rychlik et al.

(10) Patent No.: US 8,650,426 B2
(45) Date of Patent: Feb. 11, 2014

(54) SYSTEM AND METHOD FOR CONTROLLING CENTRAL PROCESSING UNIT POWER IN A VIRTUALIZED SYSTEM

(75) Inventors: Bohuslav Rychlik, San Diego, CA (US);
Ali Iranli, San Diego, CA (US); Brian J. Salsbery, Boulder, CO (US); Sumit Sur, Boulder, CO (US); Steven S. Thomson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 12/944,202

(22) Filed: Nov. 11, 2010

(65) Prior Publication Data

US 2011/0145616 A1    Jun. 16, 2011

Related U.S. Application Data

(60) Provisional application No. 61/286,960, filed on Dec. 16, 2009.

(51) Int. Cl.
*G06F 1/00* (2006.01)

(52) U.S. Cl.
USPC .......................................... 713/323

(58) Field of Classification Search
USPC .................................. 713/300, 323
See application file for complete search history.

(56) References Cited

U.S. PATENT DOCUMENTS

| | | | |
|---|---|---|---|
| 5,644,769 A | 7/1997 | Hasiguti | |
| 6,076,171 A | 6/2000 | Kawata | |
| 6,804,632 B2 | 10/2004 | Orenstien et al. | |
| 6,829,713 B2 * | 12/2004 | Cooper et al. | 713/320 |
| 6,978,389 B2 | 12/2005 | Jahnke | |
| 7,043,405 B2 | 5/2006 | Orenstien et al. | |
| 7,058,824 B2 | 6/2006 | Plante et al. | |
| 7,107,187 B1 | 9/2006 | Saghier et al. | |
| 7,133,806 B2 | 11/2006 | Prasad | |
| 7,134,031 B2 | 11/2006 | Flautner | |
| 7,219,245 B1 | 5/2007 | Raghuvanshi | |
| 7,233,188 B1 | 6/2007 | Takano et al. | |
| 7,263,457 B2 | 8/2007 | White et al. | |

(Continued)

FOREIGN PATENT DOCUMENTS

| | | |
|---|---|---|
| EP | 0098169 A2 | 1/1984 |
| EP | 0942363 A2 | 9/1999 |

(Continued)

OTHER PUBLICATIONS

International Search Report and Written Opinion—PCT/US2010/058075—ISA/EPO—Apr. 27, 2011.

(Continued)

*Primary Examiner* — Mohammed Rehman
(74) *Attorney, Agent, or Firm* — Nicholas A. Cole

(57) ABSTRACT

A method of dynamically controlling power within a multi-core central processing unit is disclosed and includes executing a plurality of virtual cores, virtually executing one or more tasks, one or more threads, or a combination thereof at the virtual cores, and physically executing one or more tasks, one or more threads, or a combination thereof at a zeroth physical core. The method may further include receiving a degree of parallelism in a workload of a plurality of virtual cores and determining whether the degree of parallelism in the workload of the virtual cores is equal to a first wake condition.

32 Claims, 13 Drawing Sheets

(56) References Cited

U.S. PATENT DOCUMENTS

| | | | |
|---|---|---|---|
| 7,369,967 B1 | 5/2008 | Washburn et al. | |
| 7,370,189 B2 | 5/2008 | Fischer et al. | |
| 7,398,407 B2 | 7/2008 | Jorgenson et al. | |
| 7,401,240 B2 | 7/2008 | Heller, Jr. et al. | |
| 7,437,581 B2 | 10/2008 | Grochowski et al. | |
| 7,467,291 B1 | 12/2008 | Cockroft et al. | |
| 7,500,124 B2 | 3/2009 | Seo | |
| 7,543,161 B2 | 6/2009 | Olszewski et al. | |
| 7,669,067 B2 | 2/2010 | Degenhardt | |
| 7,689,838 B2 * | 3/2010 | Srinivasan et al. | 713/300 |
| 7,711,966 B2 | 5/2010 | Prabhakaran et al. | |
| 7,783,906 B2 | 8/2010 | Turner et al. | |
| 2002/0046354 A1 | 4/2002 | Ostrom et al. | |
| 2002/0188877 A1 | 12/2002 | Buch | |
| 2003/0115495 A1 | 6/2003 | Rawson, III | |
| 2004/0225902 A1 | 11/2004 | Cesare et al. | |
| 2004/0254765 A1 * | 12/2004 | Lee et al. | 702/186 |
| 2005/0102560 A1 | 5/2005 | Taketoshi et al. | |
| 2006/0036878 A1 | 2/2006 | Rothman et al. | |
| 2006/0123253 A1 | 6/2006 | Morgan et al. | |
| 2006/0149975 A1 | 7/2006 | Rotem et al. | |
| 2007/0033425 A1 | 2/2007 | Clark | |
| 2007/0033526 A1 | 2/2007 | Thompson et al. | |
| 2007/0255929 A1 | 11/2007 | Kasahara et al. | |
| 2008/0005591 A1 | 1/2008 | Trautman et al. | |
| 2008/0028244 A1 | 1/2008 | Capps et al. | |
| 2008/0168287 A1 | 7/2008 | Berry et al. | |
| 2008/0201591 A1 | 8/2008 | Hu et al. | |
| 2008/0310099 A1 | 12/2008 | Monferrer et al. | |
| 2009/0037922 A1 | 2/2009 | Herington | |
| 2009/0049314 A1 | 2/2009 | Taha et al. | |
| 2009/0106576 A1 | 4/2009 | Jacobowitz et al. | |
| 2009/0150695 A1 | 6/2009 | Song et al. | |
| 2009/0150696 A1 | 6/2009 | Song et al. | |
| 2009/0187775 A1 | 7/2009 | Ishikawa | |
| 2009/0217276 A1 * | 8/2009 | Brenner et al. | 718/102 |
| 2009/0230930 A1 | 9/2009 | Jain et al. | |
| 2009/0249347 A1 | 10/2009 | Henmi | |
| 2009/0271646 A1 * | 10/2009 | Talwar et al. | 713/322 |
| 2009/0276642 A1 | 11/2009 | Burton et al. | |
| 2010/0076733 A1 | 3/2010 | Kumar et al. | |
| 2010/0122101 A1 | 5/2010 | Naffziger et al. | |
| 2011/0023047 A1 | 1/2011 | Memik et al. | |
| 2011/0145559 A1 | 6/2011 | Thomson et al. | |
| 2011/0145605 A1 | 6/2011 | Sur et al. | |
| 2011/0145615 A1 | 6/2011 | Rychlik et al. | |
| 2011/0145617 A1 | 6/2011 | Thomson et al. | |
| 2011/0145624 A1 | 6/2011 | Rychlik et al. | |
| 2011/0145824 A1 | 6/2011 | Thomson et al. | |
| 2013/0074085 A1 | 3/2013 | Thomson et al. | |
| 2013/0151879 A1 | 6/2013 | Thomson | |

FOREIGN PATENT DOCUMENTS

| | | |
|---|---|---|
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11282695 A | 10/1999 |
| JP | 2002099433 A | 4/2002 |
| JP | 2004533674 A | 11/2004 |
| JP | 2005128937 A | 5/2005 |
| JP | 2006011548 A | 1/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| WO | WO0225414 A2 | 3/2002 |
| WO | WO-02074046 A2 | 9/2002 |
| WO | WO2005119412 A1 | 12/2005 |
| WO | 2006037119 A2 | 4/2006 |
| WO | 2007007300 A2 | 1/2007 |
| WO | 2008047179 A1 | 4/2008 |

OTHER PUBLICATIONS

International Search Report and Written Opinion—PCT/US2010/059535. ISA/EPO—Apr. 28, 2011.

International Search Report and Written Opinion—PCT/US2010/059560—ISA/EPO—Jun. 15, 2011.

International Search Report and Written Opinion—PCT/US2010/059562, ISA/EPO—May 27, 2011.

International Search Report and Written Opinion—PCT/US2010/059538, International Search Authority—European Patent Office—Apr. 7, 2011.

Compaq et al, "Advanced Configuration and Power Interface Specification", Compaq Computer Corporation, Intel Cor0poration, Microsoft Corporation, Phoenix Technologies Ltd., Toshiba Corporation, Revision 2.0, Jul. 27, 2000.

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

Semeraro et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.

Stallings, W., "Operating systems internals and design principles," 2005, Pearson, 5th edition, section 3.2, pp. 111-126.

iDebian, CPU frequency scaling in Linux, Jun. 26, 2008, iDebian's Weblog.

Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86.

* cited by examiner

SYSTEM AND METHOD FOR CONTROLLING CENTRAL PROCESSING UNIT POWER IN A VIRTUALIZED SYSTEM

RELATED APPLICATIONS

The present application claims priority to U.S. Provisional Patent Application Ser. No. 61/286,960, entitled SYSTEM AND METHOD OF DYNAMICALLY CONTROLLING A PLURALITY OF CORES IN A MULTICORE CENTRAL PROCESSING UNIT, filed on Dec. 16, 2009, the contents of which are fully incorporated by reference.

CROSS-REFERENCED APPLICATIONS

The present application is related to, and incorporates by reference, U.S. patent application Ser. No. 12/944,140, entitled SYSTEM AND METHOD FOR CONTROLLING CENTRAL PROCESSING UNIT POWER BASED ON INFERRED WORKLOAD PARALLELISM, by Rychlik et al., filed concurrently. The present application is related to, and incorporates by reference, U.S. patent application Ser. No. 12/944,321, entitled SYSTEM AND METHOD FOR ASYNCHRONOUSLY AND INDEPENDENTLY CONTROLLING CORE CLOCKS IN A MULTICORE CENTRAL PROCESSING UNIT, by Rychlik et al., filed concurrently. The present application is related to, and incorporates by reference, U.S. patent application Ser. No. 12/944,378, entitled SYSTEM AND METHOD FOR CONTROLLING CENTRAL PROCESSING UNIT POWER WITH REDUCED FREQUENCY OSCILLATIONS, by Thomson et al., filed concurrently. The present application is related to, and incorporates by reference, U.S. patent application Ser. No. 12/944,467, entitled SYSTEM AND METHOD FOR CONTROLLING CENTRAL PROCESSING UNIT POWER WITH GUARANTEED TRANSIENT DEADLINES, by Thomson et al., filed concurrently. The present application is related to, and incorporates by reference, U.S. patent application Ser. No. 12/944,561, entitled SYSTEM AND METHOD FOR CONTROLLING CENTRAL PROCESSING UNIT POWER WITH GUARANTEED STEADY STATE DEADLINES, by Thomson et al., filed concurrently. The present application is related to, and incorporates by reference, U.S. patent application Ser. No. 12/944,564, entitled SYSTEM AND METHOD FOR DYNAMICALLY CONTROLLING A PLURALITY OF CORES IN A MULTICORE CENTRAL PROCESSING UNIT BASED ON TEMPERATURE, by Sur et al., filed concurrently.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power within a multicore CPU.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
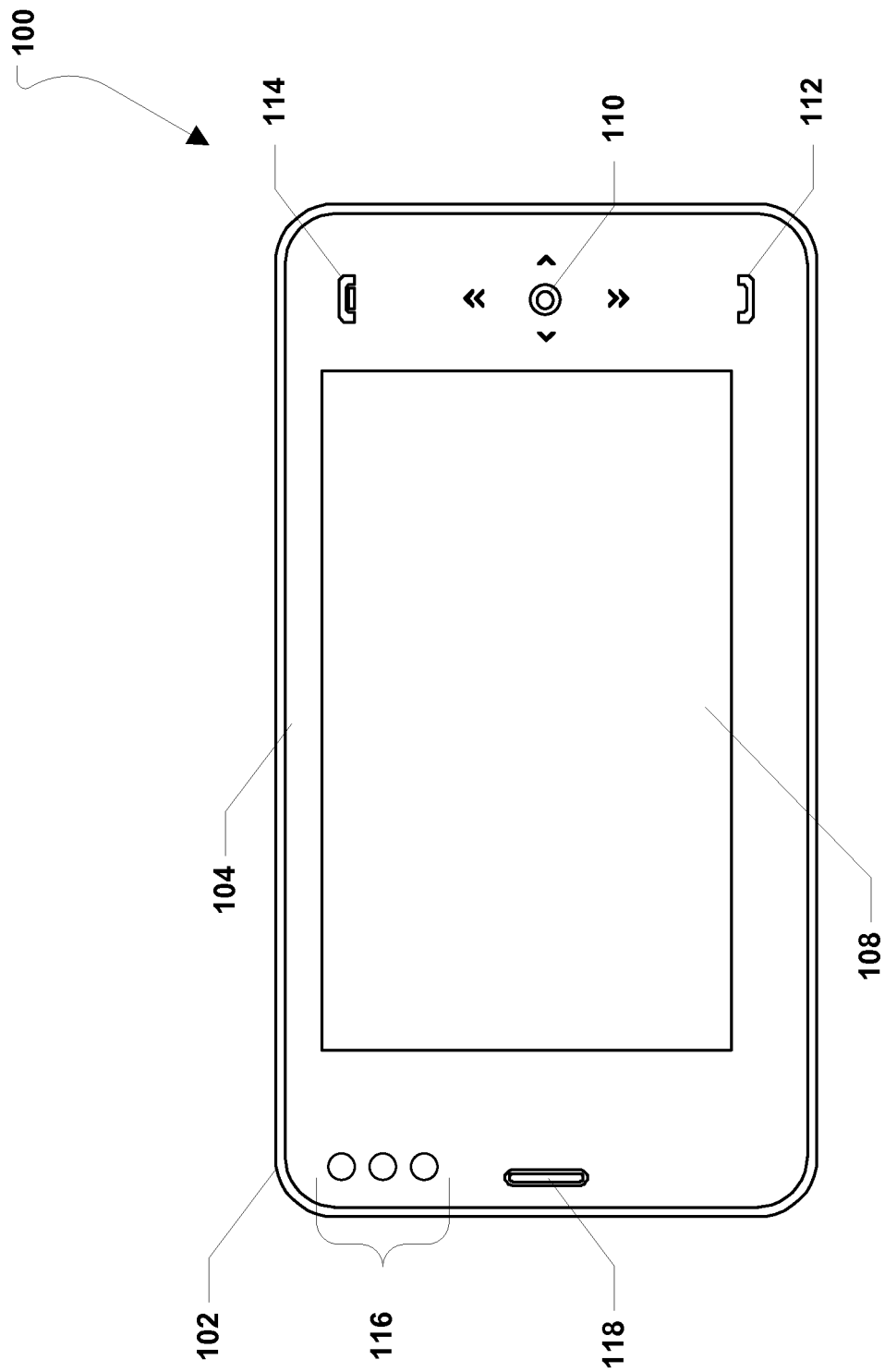
FIG. 1 is a front plan view of a first aspect of a portable computing device (PCD) in a closed position.
Figure 2:
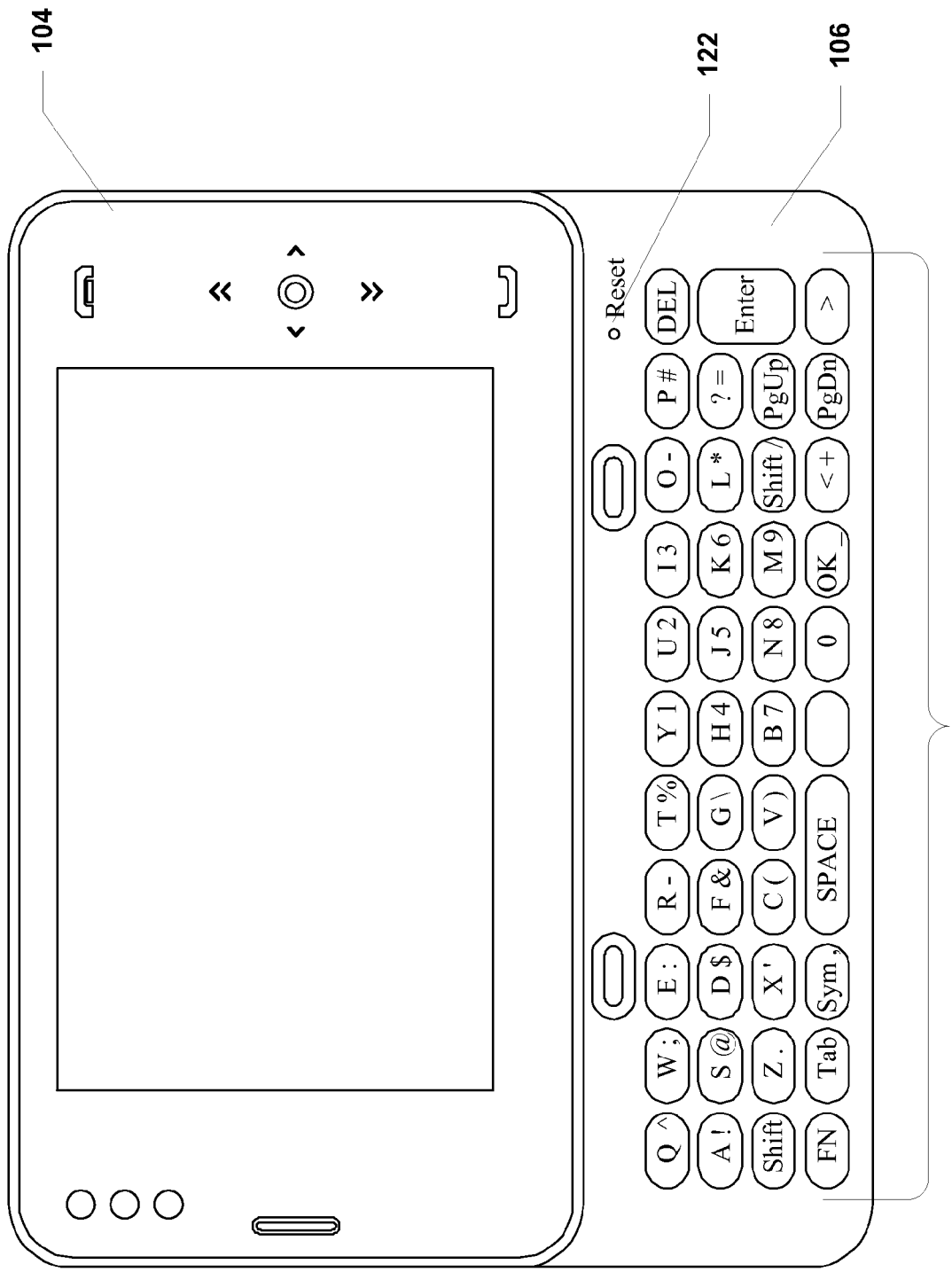
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
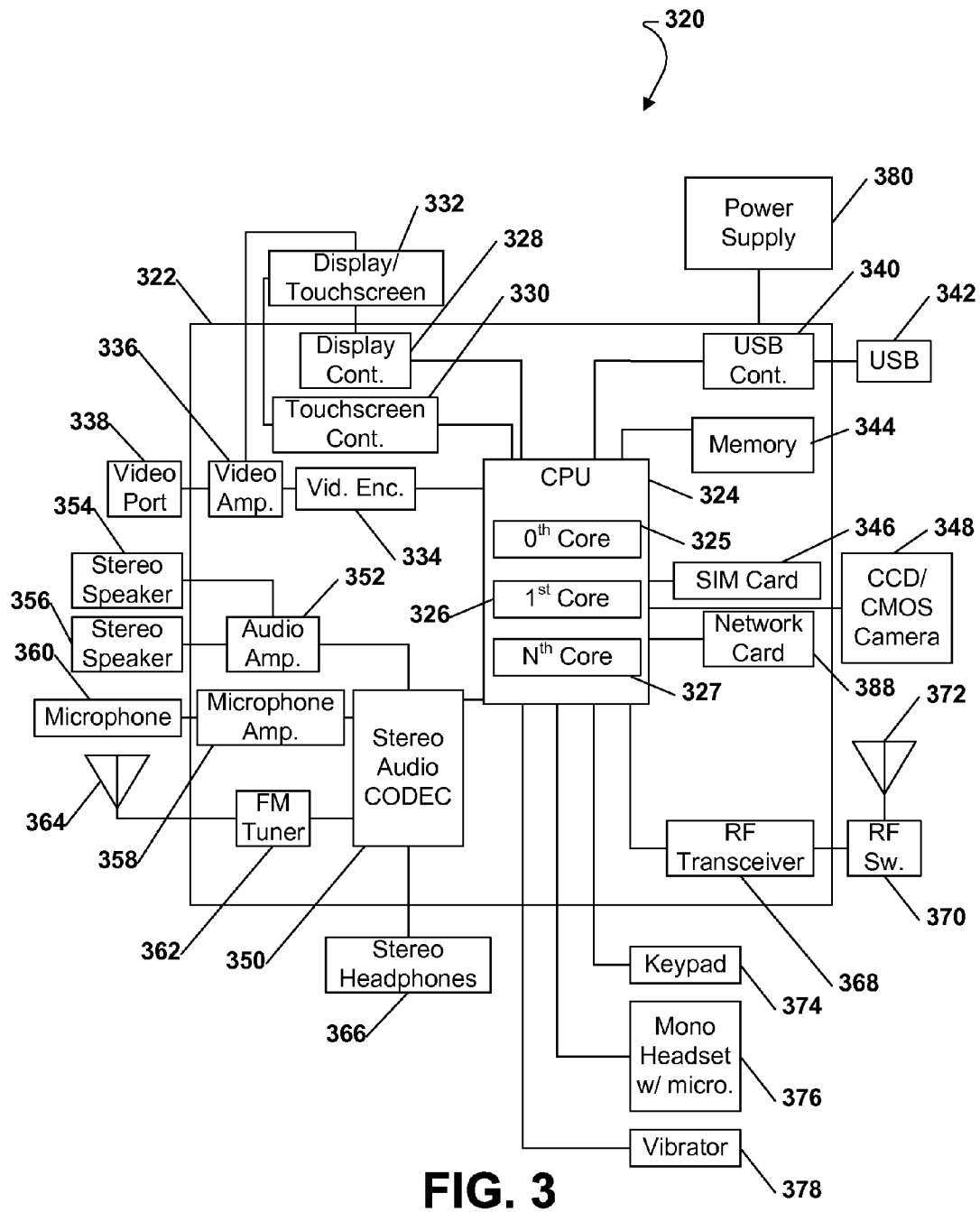
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to control the power to each CPU, or core, within the multicore CPU324.

Figure 4:
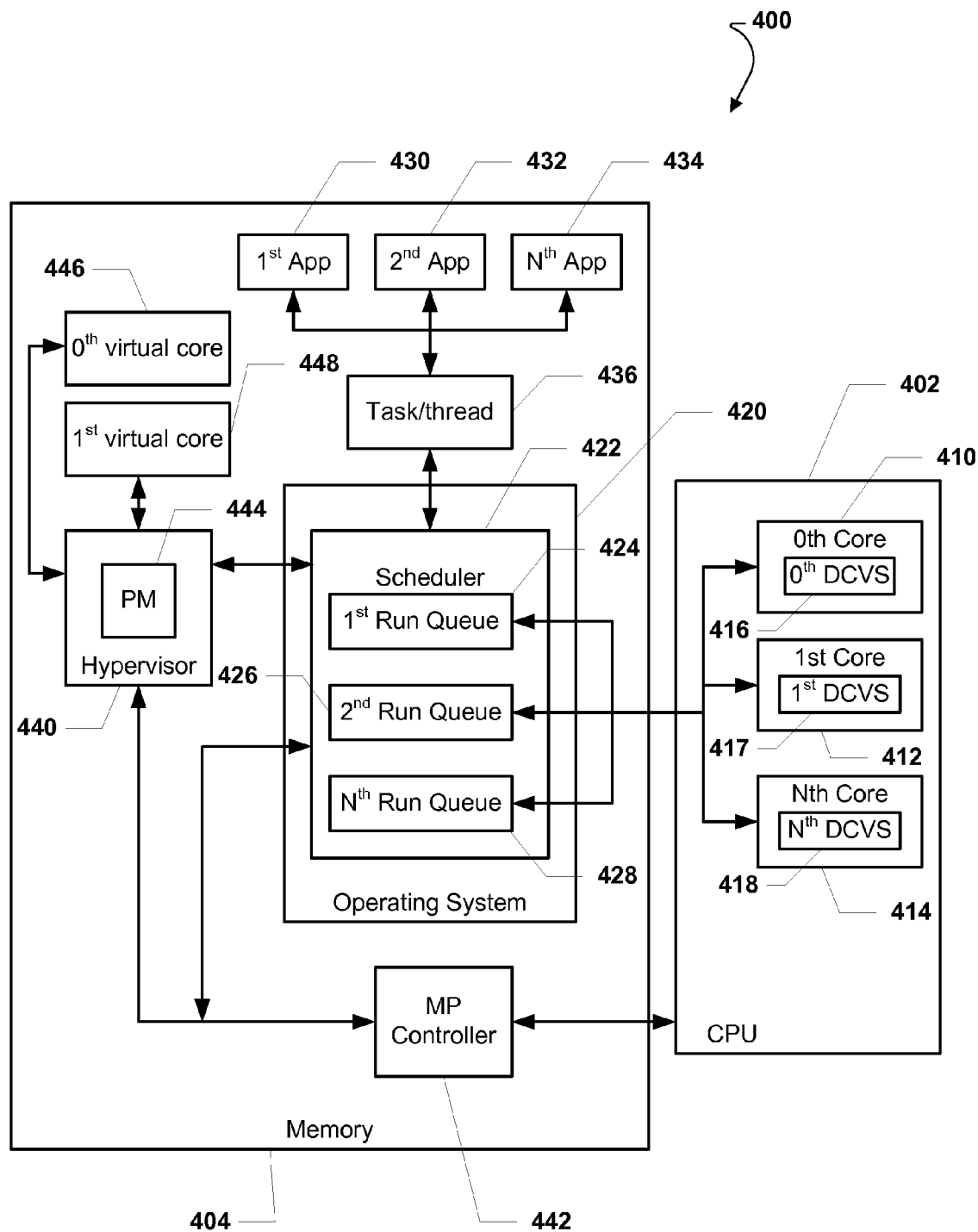
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the physical cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The physical cores 410, 412, 414 may retrieve the tasks, threads, or a combination thereof from the run queues 424, 426, 428 as instructed, e.g., by the operating system 420 for processing, or execution, of those task and threads at the physical cores 410, 412, 414.

FIG. 4 also shows that the memory 404 may include a hypervisor 440 and a multicore processor (MP) controller 442 stored thereon. The hypervisor 440 may be connected to the operating system 420 and the MP controller 442. Specifically, the hypervisor 440 may be connected to the scheduler 422 within the operating system 420. The hypervisor 440 may include a parallelism monitor (PM) 444. Alternatively, the parallelism monitor 444 may be separate from the hypervisor 440, but connected thereto. As shown, the memory 404 may also include a zeroth virtual core 446 and a first virtual core 448. The OS 420 may interact with the virtual cores 446, 448 via the hypervisor 440 as if the virtual cores 446, 448 are executing threads. However, tasks, threads, or a combination thereof may actually be executed on the physical cores 410, 412, 414. The virtual cores 446, 448 may represent a virtualized environment that is accessible to the OS 420.

As described herein, the hypervisor 440 may monitor the workload on the virtual cores 446, 448 and the MP controller 442 may control the power to the physical cores 410, 412, 414 as described below. In a particular aspect, by executing one or more of the method steps, e.g., as computer program instructions, described herein, the hypervisor 440, the MP controller 442, the parallelism monitor 444, or a combination thereof may serve a means for dynamically controlling the power to the cores 410, 412, 414 within the multicore CPU 402.

In a particular dual-virtual core aspect, during operating, the MP controller 442 may receive an input from the hypervisor 440. The input may be a running average of the degree of parallelism in the workload. Based on the input, the MP controller 442 may determine whether a single physical core or two physical cores should be powered on. Further, the MP controller 442 may output a control signal to the multicore CPU 402. The control signal may indicate whether to turn additional cores on or off. In the dual-virtual core example, the MP controller 442 may include four threshold values for controlling the decision to power the physical cores on and off. The four threshold values may include a number of ready-to-run threads in the OS scheduler queue to trigger a core wake, $N_w$; a time duration for which $N_w$ has been exceed to confirm a core wake, $T_w$; a number of ready-to-run threads in the OS scheduler to trigger a core sleep, $N_s$; and a time duration for which Ns has been exceeded to confirm a core sleep, $T_s$.

Beginning with a single core active, e.g., the zeroth core 410, when the running average of the degree of parallelism in the workload on the zeroth core 410 meets or exceeds $N_w$ for a duration of at least $T_w$, the MP controller 442 may wake up a second core, e.g., the first core 412. Conversely, when both cores, e.g., the zeroth core 410 and the first core 412, are active and when the degree of parallelism in the workload falls below $N_s$ for at least a duration of $T_s$, the MP controller 442 may decide to put the second core, e.g., the first core 412, to sleep.

In a particular aspect, sustained threshold parallelism over the time $T_w$ implies that the single virtual core is saturated. Further, the physical cores may be started at the most power efficient voltage-frequency (VF) operating point. In particular aspect, two physical cores operating at an optimal VF offer more Dhrystone million instructions per second (DMIPS) than a single core operating at a maximum VF. In a dual-core aspect, dual, independent DCVS algorithms may adapt to asymmetric workloads and in some cases, heterogeneous cores. Further, in a dual-core aspect, the two physical cores should remain active during multi-tasking workloads in order to avoid a performance penalty that is doubled. Also, when the parallelism falls below $N_s$ for the prescribed time $T_s$, the second core should be powered off and not placed in standby. In a particular aspect, placing the second core in standby may increase power leakage and also may reduce performance.

The optimal values of the parameters $N_w$, $T_w$, $N_s$, and $T_s$ may depend on the exact power consumption characteristics of the system 400. However, in one aspect, the values may be as follows:
$N_w$=1.2,
$T_w$=40 milliseconds (ms),
$N_s$=0.8, and
$T_s$=80 ms.

In this particular aspect, $N_w$=1.2 may ensure a sustained parallelism before the second core is awakened. $N_s$=0.8 may ensure a sustained absence of parallelism before the second core is put asleep. $T_s$=80 ms is based on a power collapse threshold of the system 400. $T_w$=40 ms is half of $T_s$ to improve multicore responsiveness.

Figure 5:
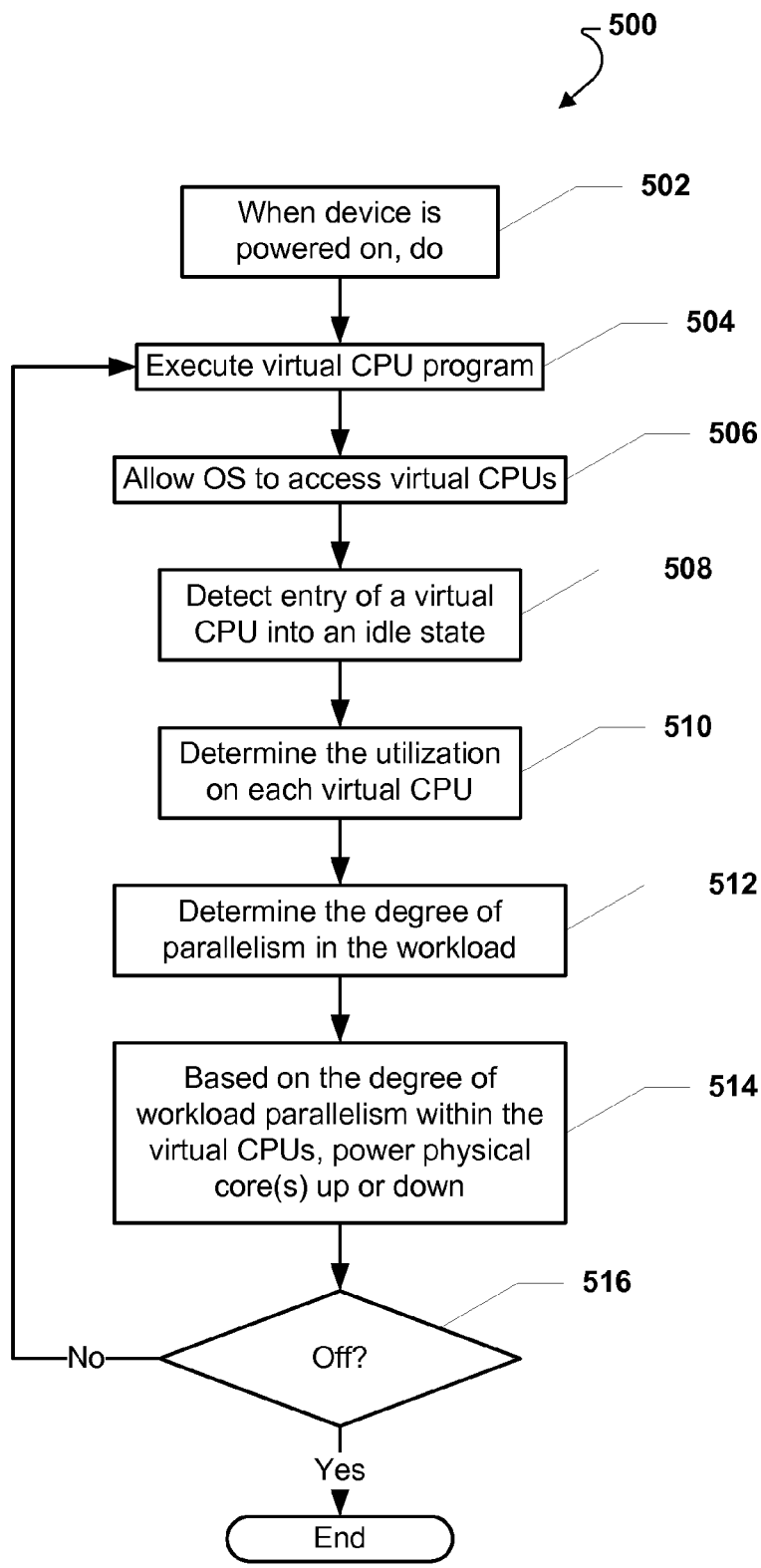
FIG. 5 is a flowchart illustrating a first aspect of a method of dynamically controlling power within a multicore CPU.

Referring to FIG. 5, a first aspect of a method of controlling power within a multi-core processor is shown and is generally designated 500. The method 500 commences at block 502 with a do loop in which during operation of a device having a multi-core processor, the succeeding steps may be performed. At block 504, a virtual central processing unit (CPU) program may be executed within a physical processor. When executed, the virtual CPU program cause two or more virtual CPUs to run on the physical processor. The virtual CPUs may simulate two or more physical processors operating within the device. At block 506, an operating system (OS) may be allowed to access the virtual CPUs. In a particular aspect, the OS may access the virtual CPUs in the same manner typically used to access physical CPUs.

Moving to block 508, a hypervisor, aka, a virtual machine manager, may detect the entry of a virtual CPU into an idle state, e.g., each time the virtual CPU enters an idle state. At block 510, the hypervisor may determine the utilization on each virtual CPU. The utilization may be determined by first determining a number of actual virtual cycles. The actual virtual cycles are cycles during which the virtual CPU is not idled or is not running an OS idle task. Thereafter, the utilization may be determined by dividing the number of active virtual cycles by the total number of virtual CPU cycles.

Proceeding to block 512, the hypervisor may determine the degree of parallelism in the workload of the virtual CPUs based on the utilization on each virtual CPU. Next, at block 514, a controller, e.g., a parallelism monitor may power the physical core(s) up or down at least partially based on the degree of parallelism in the workload of the virtual CPUs. In other words, the parallelism monitor may turn the cores on or off based on the workload in the virtual cores.

At decision 516, the parallelism monitor may determine whether the device is powered off. If the device is powered off, the method may end. Otherwise, if the device remains powered on, the method 500 may return to block 504 and the method 500 may continue as described.

Figure 6:
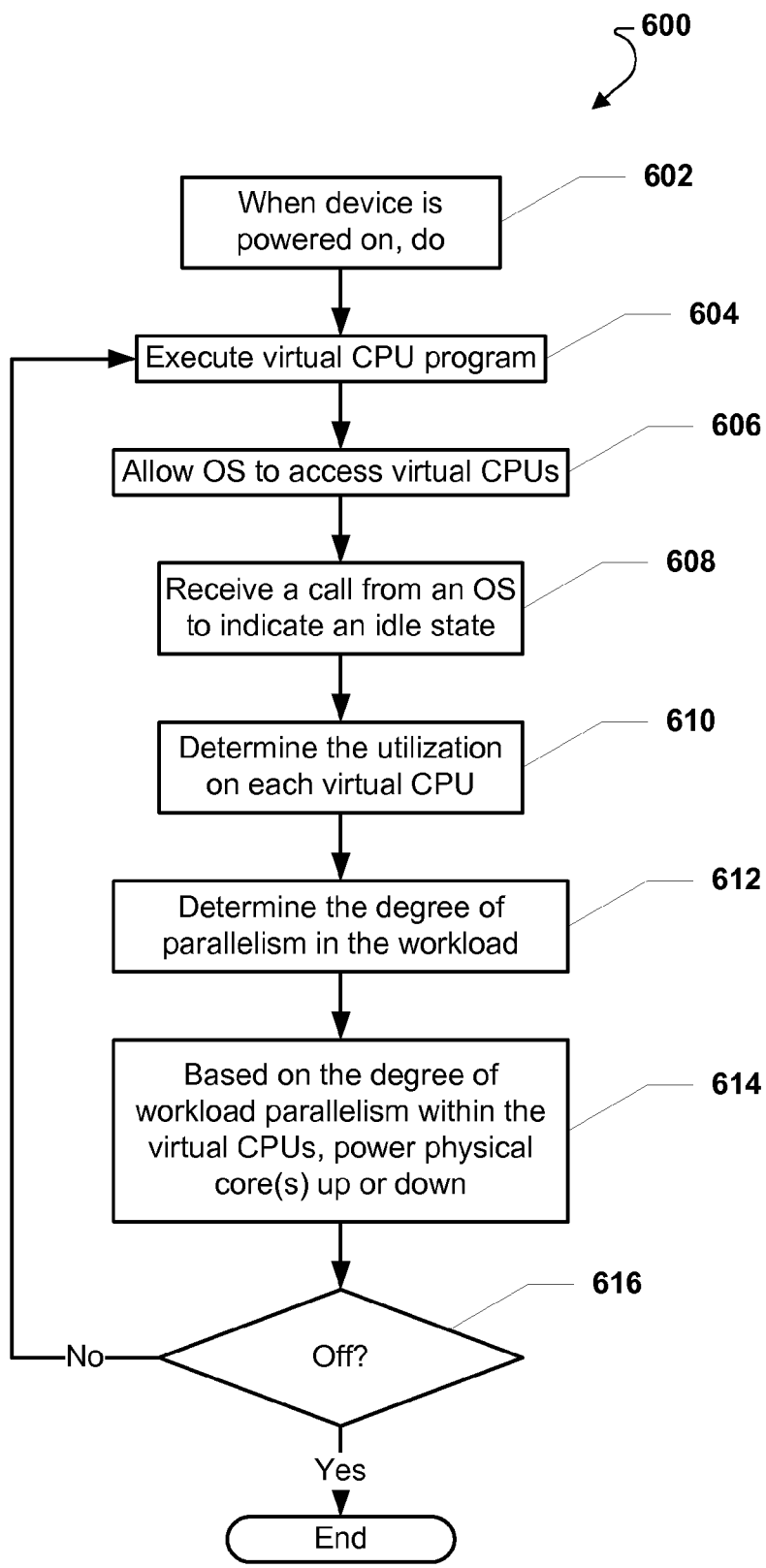
FIG. 6 is a flowchart illustrating a second aspect of a method of dynamically controlling power within a multicore CPU.

FIG. 6 illustrates a second aspect of a method of controlling power within a multi-core processor. The method is generally designated 600. The method 600 commences at block 602 with a do loop in which during operation of a device having a multi-core processor, the succeeding steps may be performed. At block 604, a virtual central processing unit (CPU) program may be executed within a physical processor. When executed, the virtual CPU program cause two or more virtual CPUs to run on the physical processor. The virtual CPUs may simulate two or more physical processors operating within the device. At block 606, an operating system (OS) may be allowed to access the virtual CPUs. In a particular aspect, the OS may access the virtual CPUs in the same manner typically used to access physical CPUs.

Moving to block 608, a hypervisor, aka, a virtual machine manager, may receive a call from an operating system (OS) to indicate an idle state of a virtual processor, e.g., each time the virtual CPU enters an idle state. At block 610, the hypervisor may determine the utilization on each virtual CPU. The utilization may be determined by first determining a number of actual virtual cycles. The actual virtual cycles are cycles during which the virtual CPU is not idled or is not running an OS idle task. Thereafter, the utilization may be determined by dividing the number of active virtual cycles by the total number of virtual CPU cycles.

Proceeding to block 612, the hypervisor may determine the degree of parallelism in the workload of the virtual CPUs based on the utilization on each virtual CPU. Next, at block 614, the hypervisor may power the physical core(s) up or down at least partially based on the degree of parallelism in the workload of the virtual CPUs. In other words, the power controller may turn the cores on or off based on the workload.

At decision 616, the power controller may determine whether the device is powered off. If the device is powered off, the method may end. Otherwise, if the device remains powered on, the method 600 may return to block 604 and the method 600 may continue as described.

Figure 7:
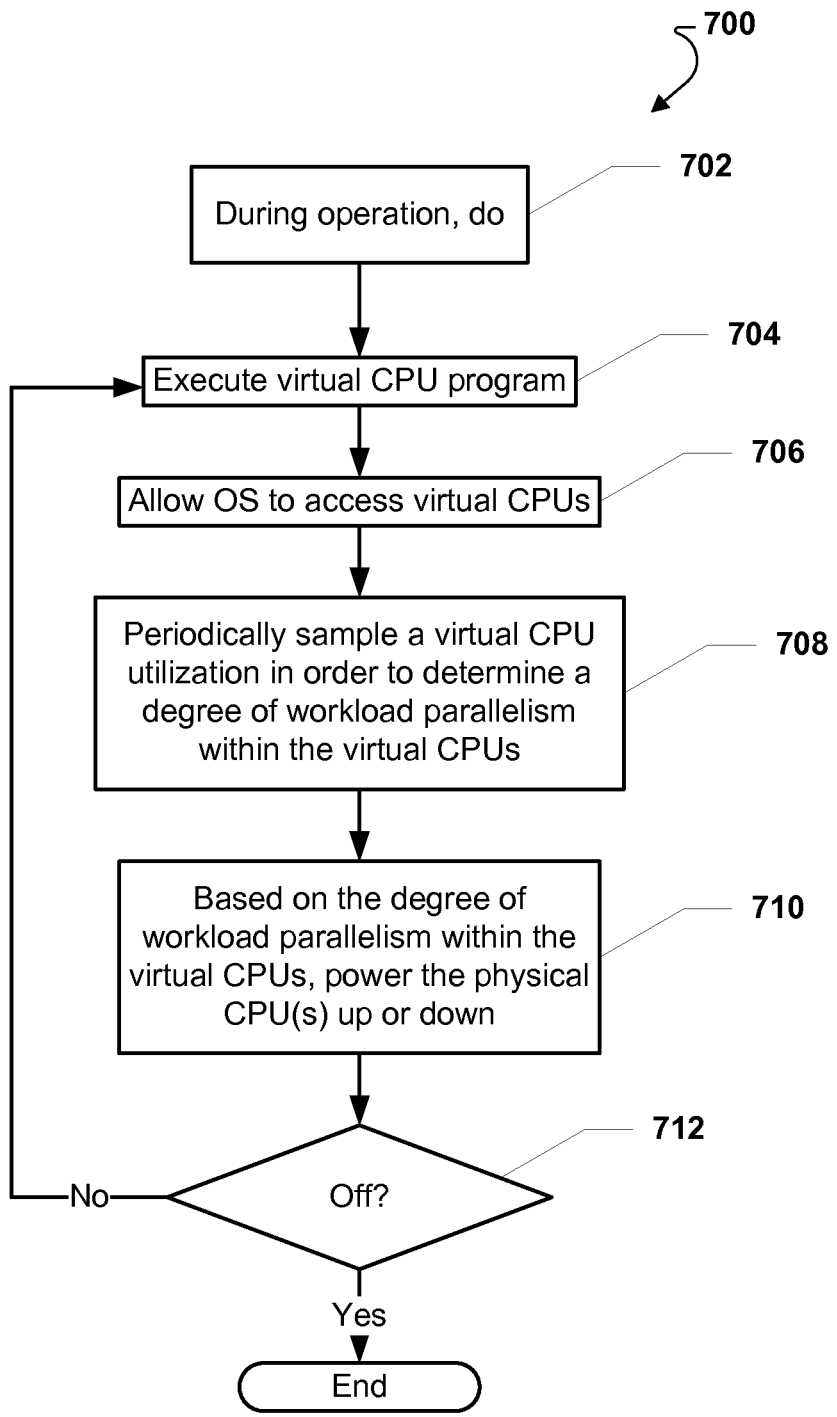
FIG. 7 is a flowchart illustrating a third aspect of a method of dynamically controlling power within a multicore CPU.

Referring now to FIG. 7, a third aspect of a method of controlling power within a multi-core processor is shown and is generally designated 700. The method 700 commences at block 702 with a do loop in which during operation of a device having a multi-core processor, the succeeding steps may be performed.

At block 704, a virtual central processing unit (CPU) program may be executed within a physical processor. When executed, the virtual CPU program cause two or more virtual CPUs to run on the physical processor. The virtual CPUs may simulate two or more physical processors operating within the device. At block 706, an operating system (OS) may be allowed to access the virtual CPUs. In a particular aspect, the OS may access the virtual CPUs in the same manner typically used to access physical CPUs.

Moving to block 708, a power controller, e.g., a parallelism monitor, may periodically sample a virtual CPU utilization in order to determine a degree of workload parallelism within the virtual CPUs, or cores. Moving to block 710, at least partially based on the degree of workload parallelism within the virtual CPUs, the power controller may power the physical core(s) up or down. In other words, the power controller may turn the cores on or off based on the workload.

At decision 712, the power controller may determine whether the device is powered off. If the device is powered off, the method may end. Otherwise, if the device remains powered on, the method 700 may return to block 704 and the method 700 may continue as described.

Figure 8:
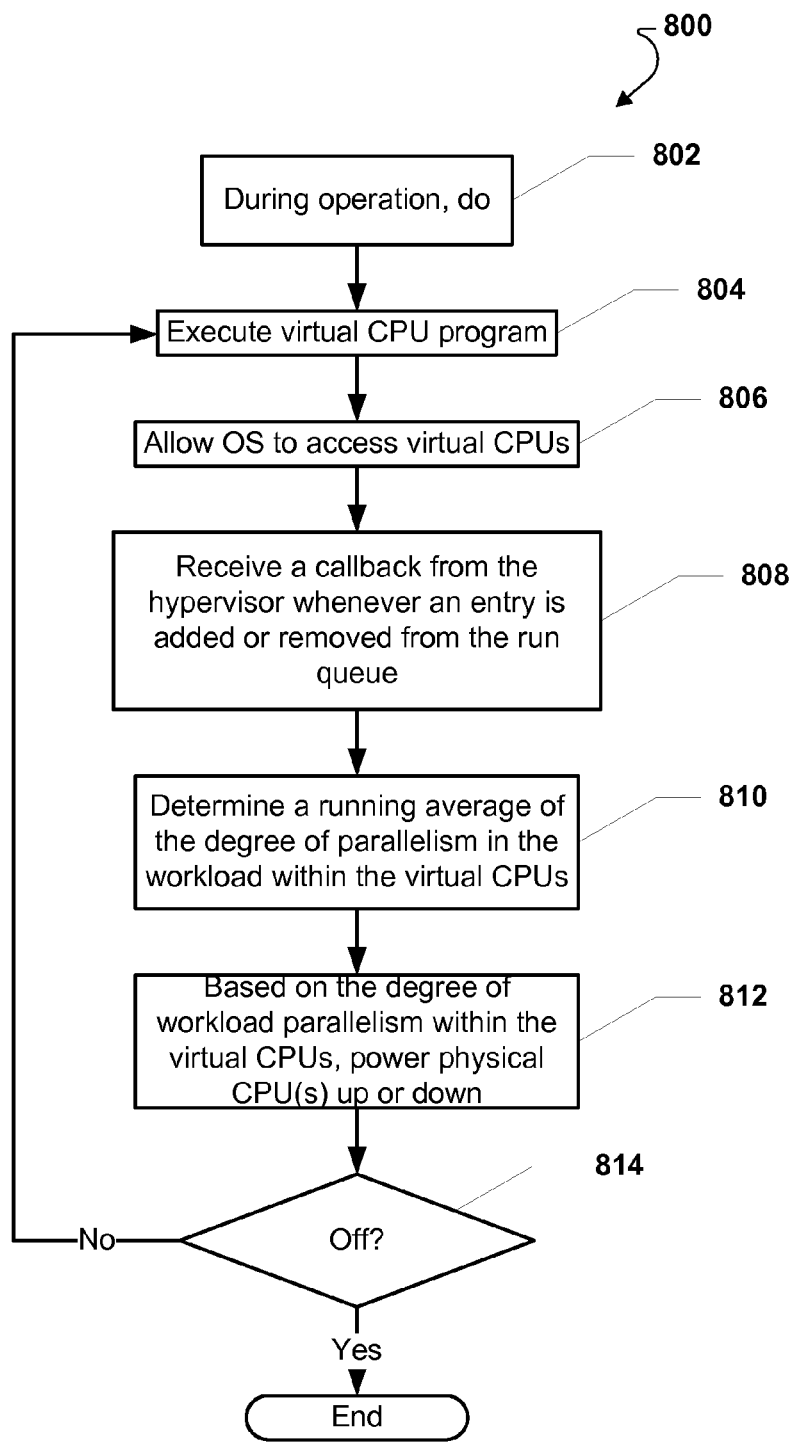
FIG. 8 is a flowchart illustrating a fourth aspect of a method of dynamically controlling power within a multicore CPU.
Figure 9:
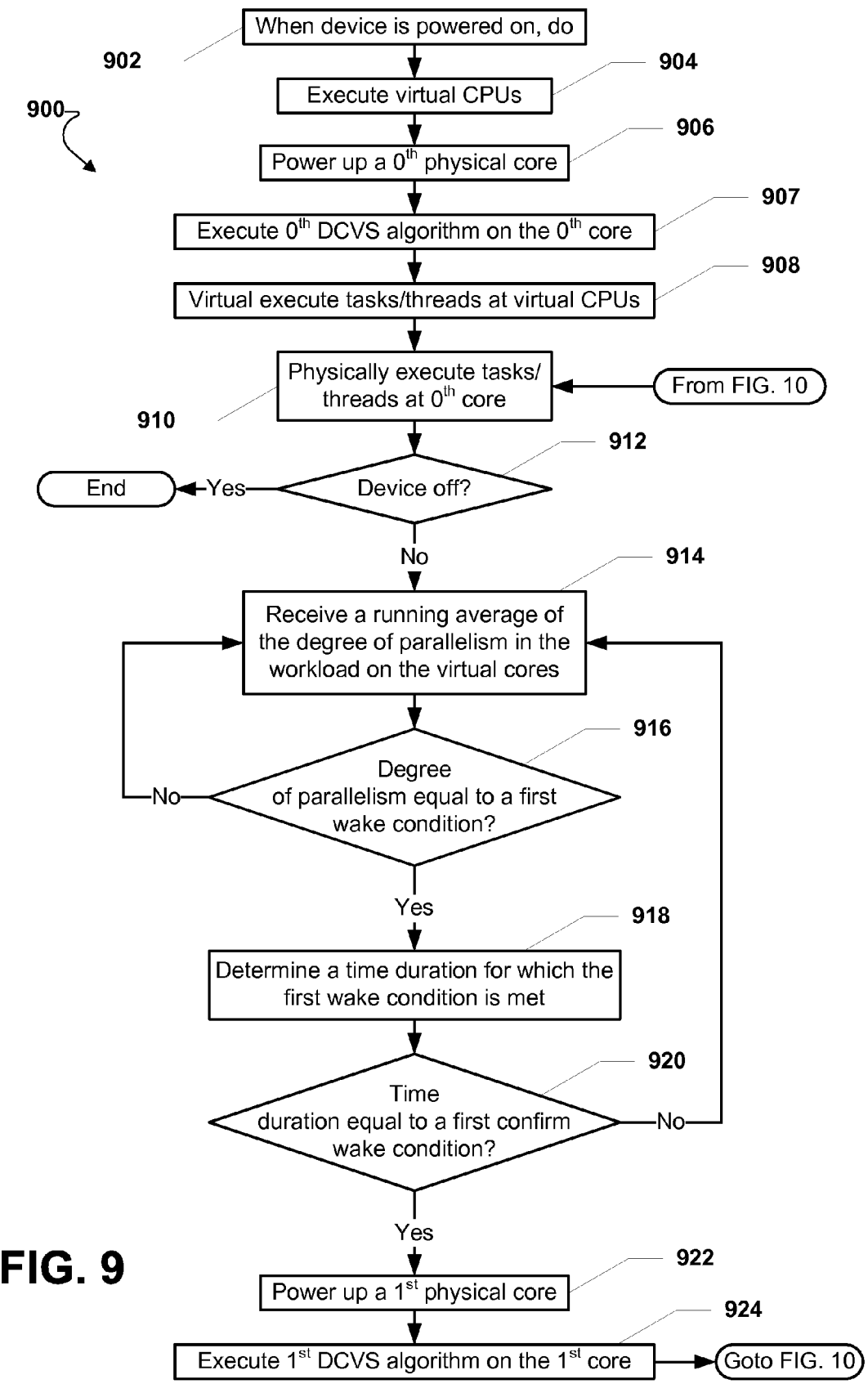
FIG. 9 is a flowchart illustrating a first portion of a fifth aspect of a method of dynamically controlling power within a multicore CPU.

FIG. 8 shows fourth aspect of a method of controlling power within a multi-core processor and the method is generally designated 800. The method 800 commences at block 802 with a do loop in which during operation of a device having a multi-core processor, the succeeding steps may be performed. At block 804, a virtual central processing unit (CPU) program may be executed within a physical processor. When executed, the virtual CPU program cause two or more virtual CPUs to run on the physical processor. The virtual CPUs may simulate two or more physical processors operating within the device. At block 806, an operating system (OS) may be allowed to access the virtual CPUs. In a particular aspect, the OS may access the virtual CPUs in the same manner typically used to access physical CPUs.

Moving to block 808, a power controller, e.g., a parallelism monitor, may receive a callback from a hypervisor whenever an entry is added or removed from the OS run queue. At block 810, the power controller may determine a running average of the degree of parallelism in the workload within the virtual CPUs. Thereafter, at block 812, at least partially based on the degree of workload parallelism within the virtual CPUs, the power controller may power the physical core(s) up or down. In other words, the power controller may turn the cores on or off based on the workload.

At decision 814, the power controller may determine whether the device is powered off. If the device is powered off, the method may end. Otherwise, if the device remains powered on, the method 800 may return to block 804 and the method 800 may continue as described.

Referring to FIG. 9 through FIG. 12, a fifth aspect of a method of controlling power within a multi-core processor is shown and is generally designated 900. The method 900 commences at block 902 with a do loop in which when a device having a multi-core processor is powered on, the following steps may be performed. At block 904, a virtual central processing unit (CPU) program may be executed within a physical processor. When executed, the virtual CPU program cause two or more virtual CPUs to run on the physical processor. The virtual CPUs may simulate two or more physical processors operating within the device.

At block 906, a zeroth physical core may be powered up, i.e., energized. At block 907, a zeroth DCVS algorithm may be executed locally at the zeroth physical core. At block 908, one or more tasks, threads, or a combination thereof may be virtually executed at the virtual CPUs. Further, at block 910, one or more tasks, threads, or a combination thereof may be executed at the zeroth physical core.

Moving to decision 912, a MP controller may determine whether the device is powered off. If so, the method 900 may end. Otherwise, if the device remains powered on, the method 900 may move to block 914 and the MP controller may receive a running average of the degree of parallelism in the workload on the virtual cores from a hypervisor. In a particular aspect, at any instant in time, the total number of tasks, threads, or a combination thereof, waiting on the ready-to-run queues of an operating system (OS) plus the number of tasks actually running may be an approximation for the degree of parallelism in the workload on the virtual cores.

At decision 916, the MP controller may determine whether the degree of parallelism is equal to a first wake condition. In a particular aspect, the first wake condition may be a threshold value associated with the degree of parallelism in the workload on the virtual cores. For example, the threshold value may be a maximum number of ready-to-run threads in the OS scheduler queues and if the degree of parallelism is greater than or equal to this threshold value, the first wake condition may be met.

Returning to decision 916, if the degree of parallelism is not equal to a first wake condition, the method 900 may return to block 914 and the method 900 may continue as described herein. Otherwise, if the degree of parallelism is equal to a first wake condition, the method 900 may move to block 918 and the MP controller may determine a time duration for which the first wake condition is met. At decision 920, the MP controller may determine whether the time duration is equal to a first confirm wake condition. In a particular aspect, the first confirm wake condition may be a threshold time value and if the time duration for which the first wake condition is met is greater than or equal to the threshold time value, the first confirm wake condition may be met.

Returning to decision 920, if the time duration for which the first wake condition is met is not equal to a first confirm wake condition, the method 900 may return to block 914 and the method 900 may continue as described herein. Conversely, if the first confirm wake condition is met, the method 900 may move to block 922 and the MP controller may power up a first physical core so that two cores, i.e., the zeroth physical core and the first physical core, are running and executing threads and tasks. At block 924, a first DCVS algorithm may be executed locally at the first physical core. Thereafter, the method 900 may proceed to block 1002 of FIG. 10.

Figure 10:
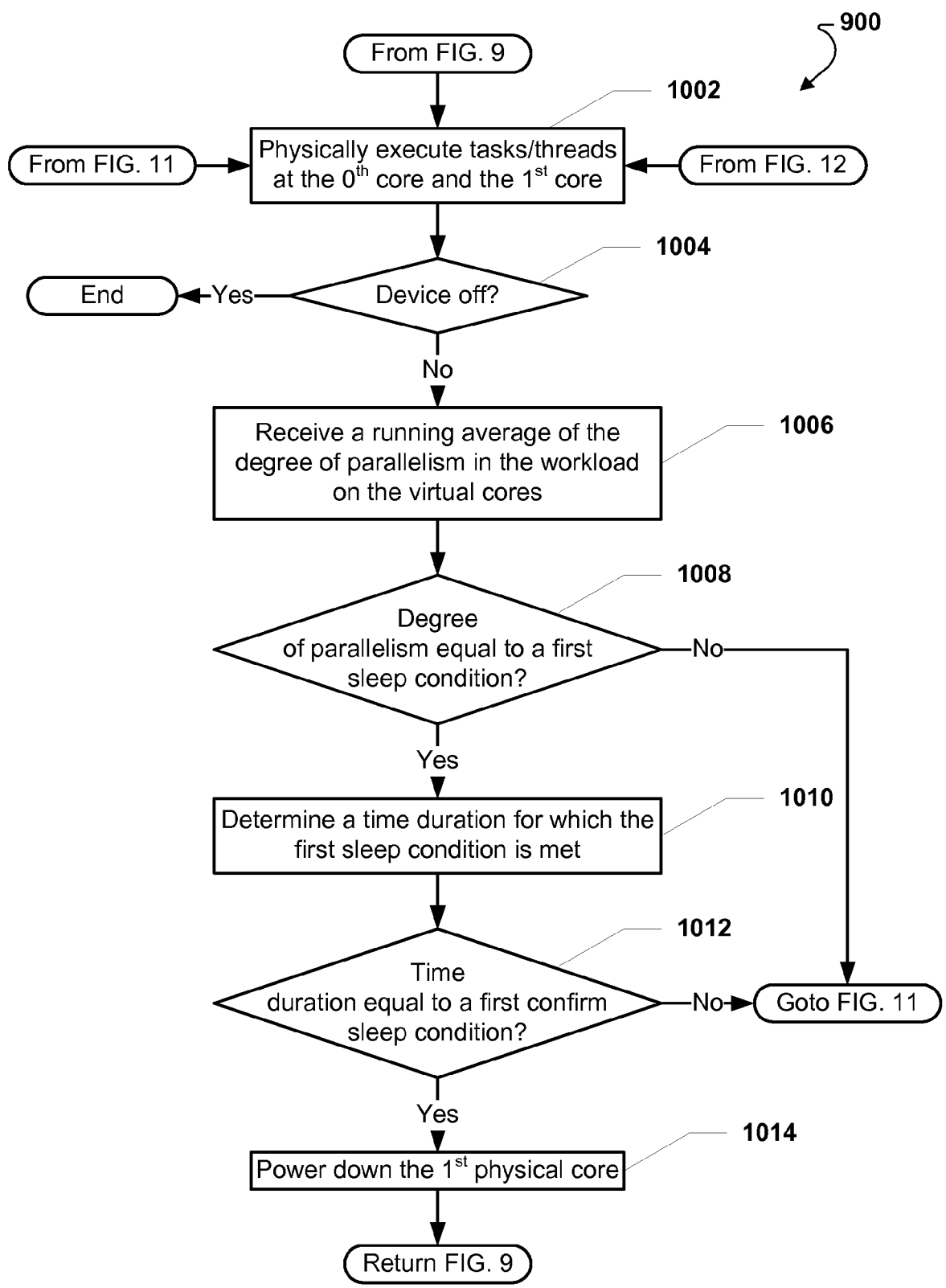
FIG. 10 is a flowchart illustrating a second portion of a fifth aspect of a method of dynamically controlling power within a multicore CPU.

Moving now to block 1002 of FIG. 10, one or more tasks, threads, or a combination thereof may be physically executed at the zeroth physical core and the first physical core. At decision 1004, a MP controller may determine whether the device is powered off. If so, the method 900 may end. Otherwise, if the device remains powered on, the method 900 may move to block 1006 and the MP controller may receive a running average of the degree of parallelism in the workload on the virtual cores from the hypervisor.

At decision 1008, the MP controller may determine whether the degree of parallelism is equal to a first sleep condition. In a particular aspect, the first sleep condition may be a threshold value associated with the degree of parallelism in the workload on the virtual cores. For example, the threshold value may be a minimum number of ready-to-run threads in the OS scheduler queues and if the degree of parallelism is less than or equal to this threshold value, the first sleep condition may be met.

Figure 11:
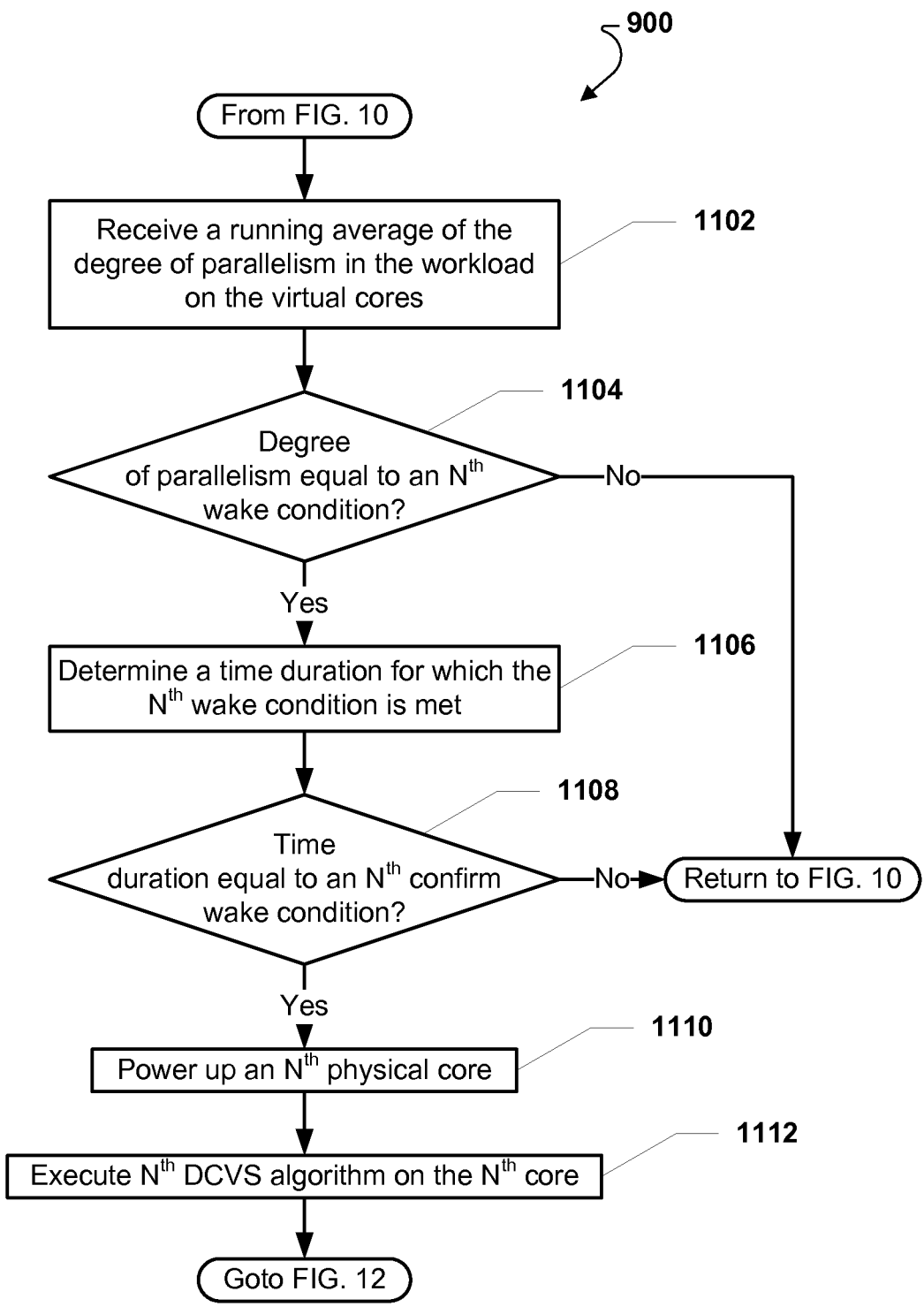
FIG. 11 is a flowchart illustrating a third portion of a fifth aspect of a method of dynamically controlling power within a multicore CPU.

Returning to decision 1008, if the degree of parallelism is not equal to the first sleep condition, the method 900 may proceed to block 1102 of FIG. 11 and the method 900 may continue as described herein. Otherwise, if the degree of parallelism is equal to the first sleep condition, the method 900 may move to block 1010 and the MP controller may determine a time duration for which the first sleep condition is met. At decision 1012, the MP controller may determine whether the time duration is equal to a first confirm sleep condition. In a particular aspect, the first confirm sleep condition may be a threshold time value and if the time duration for which the first sleep condition is met is greater than or equal to the threshold time value, the first confirm sleep condition may be met.

Returning to decision 1012, if the time duration for which the first sleep condition is met is not equal to a first confirm sleep condition, the method 900 may proceed to block 1102 of FIG. 11 and the method 900 may continue as described herein. Conversely, if the first confirm sleep condition is met, the method 900 may move to block 1014 and the MP controller may power down the first physical core so that one core, i.e., the zeroth physical core, is running and executing threads and tasks. Thereafter, the method 900 may return to block 910 of FIG. 9 and the method 900 may continue as described herein.

Referring now to FIG. 11, at block 1102, the MP controller may receive a running average of the degree of parallelism in the workload on the virtual cores from the hypervisor. At decision 1104, the MP controller may determine whether the degree of parallelism is equal to an Nth wake condition. In a particular aspect, the Nth wake condition may be a threshold value associated with the degree of parallelism in the workload on the virtual cores. For example, the threshold value may be a maximum number of ready-to-run threads in the OS scheduler queues and if the degree of parallelism is greater than or equal to this threshold value, the Nth wake condition may be met.

Returning to decision 1104, if the degree of parallelism is not equal to the Nth wake condition, the method 900 may return to block 1002 of FIG. 10 and the method 900 may continue as described herein. Otherwise, if the degree of parallelism is equal to the Nth wake condition, the method 900 may move to block 1106 and the MP controller may determine a time duration for which the Nth wake condition is met. At decision 1108, the MP controller may determine whether the time duration is equal to an Nth confirm wake condition. In a particular aspect, the Nth confirm wake condition may be a threshold time value and if the time duration for which the Nth wake condition is met is greater than or equal to the threshold time value, the Nth confirm wake condition may be met.

Returning to decision 1108, if the time duration for which the Nth wake condition is met is not equal to the Nth confirm wake condition, the method 900 may return to block 1002 of FIG. 10 and the method 900 may continue as described herein. Conversely, if the Nth confirm wake condition is met, the method 900 may move to block 1110 and the MP controller may power up an Nth physical core so that N cores, i.e., the zeroth physical core, the first physical core, and the Nth physical core, are running and executing threads and tasks. At block 1112, an Nth DCVS algorithm may be executed locally at the Nth physical core. Thereafter, the method 900 may proceed to block 1202 of FIG. 12.

Figure 12:
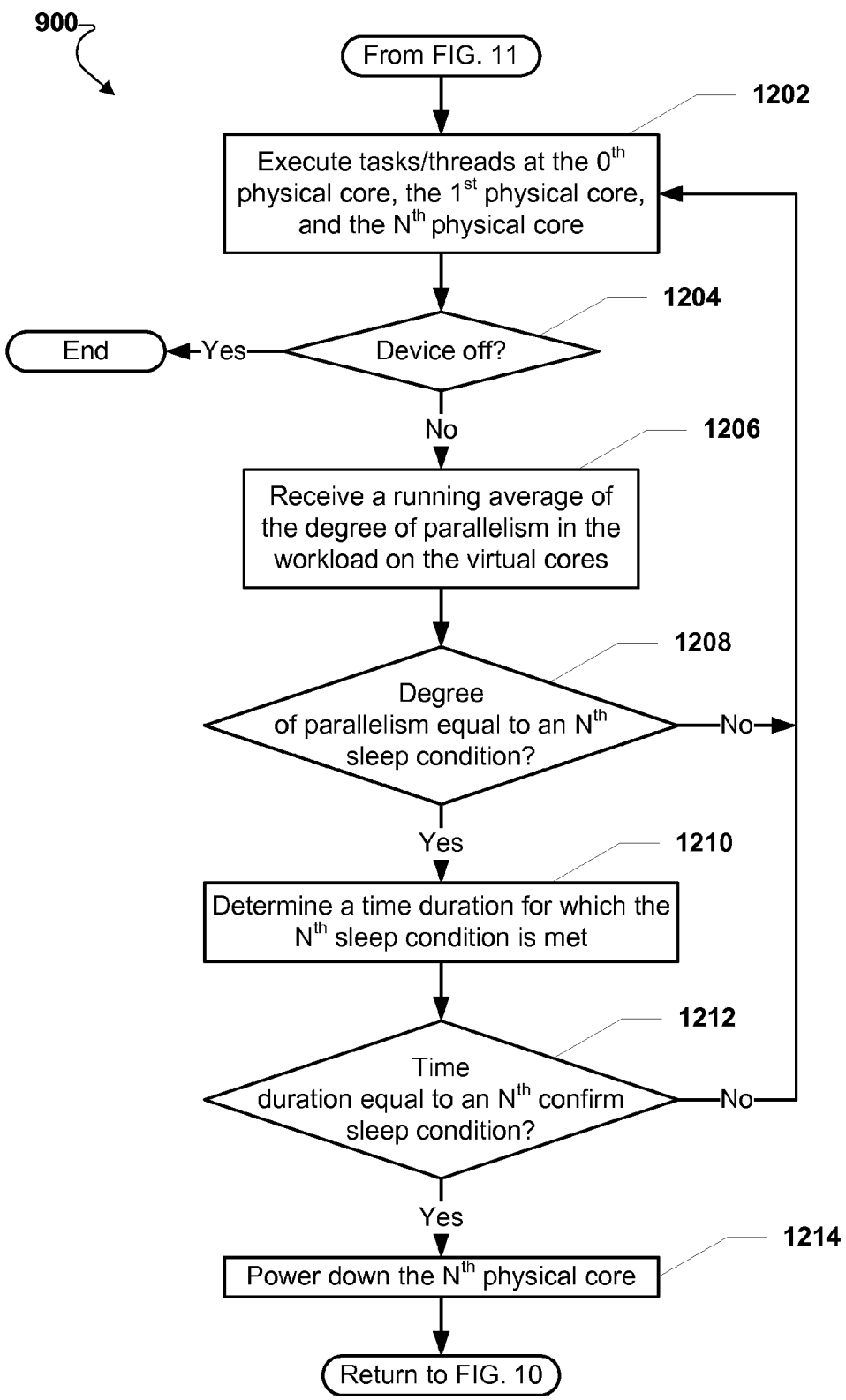
FIG. 12 is a flowchart illustrating a fourth portion of a fifth aspect of a method of dynamically controlling power within a multicore CPU.

At block 1202 of FIG. 12, one or more tasks, threads, or a combination thereof may be physically executed at the zeroth physical core, the first physical core, and the Nth physical core. At decision 1204, a MP controller may determine whether the device is powered off. If so, the method 900 may end. Otherwise, if the device remains powered on, the method 900 may move to block 1206 and the MP controller may receive a running average of the degree of parallelism in the workload on the virtual cores from the hypervisor.

At decision 1208, the MP controller may determine whether the degree of parallelism is equal to an Nth sleep condition. In a particular aspect, the Nth sleep condition may be a threshold value associated with the degree of parallelism in the workload on the virtual cores. For example, the threshold value may be a minimum number of ready-to-run threads in the OS scheduler queues and if the degree of parallelism is less than or equal to this threshold value, the Nth sleep condition may be met.

Returning to decision 1208, if the degree of parallelism is not equal to the Nth sleep condition, the method 900 may proceed to block 1202 and the method 900 may continue as described herein. Otherwise, if the degree of parallelism is equal to the Nth sleep condition, the method 900 may move to block 1210 and the MP controller may determine a time duration for which the Nth sleep condition is met. At decision 1212, the MP controller may determine whether the time duration is equal to an Nth confirm sleep condition. In a particular aspect, the Nth confirm sleep condition may be a threshold time value and if the time duration for which the Nth sleep condition is met is greater than or equal to the threshold time value, the Nth confirm sleep condition may be met.

Returning to decision 1212, if the time duration for which the Nth sleep condition is met is not equal to the Nth confirm sleep condition, the method 900 may return to block 1202 and the method 900 may continue as described herein. Conversely, if the Nth confirm sleep condition is met, the method 900 may move to block 1214 and the MP controller may power down the Nth physical core so that N minus one cores, e.g., the zeroth physical core, and the first physical core (if N is 10 and a second core is powered down), is running and executing threads and tasks. Thereafter, the method 900 may return to block 1002 of FIG. 10 and the method 900 may continue as described herein.

Figure 13:
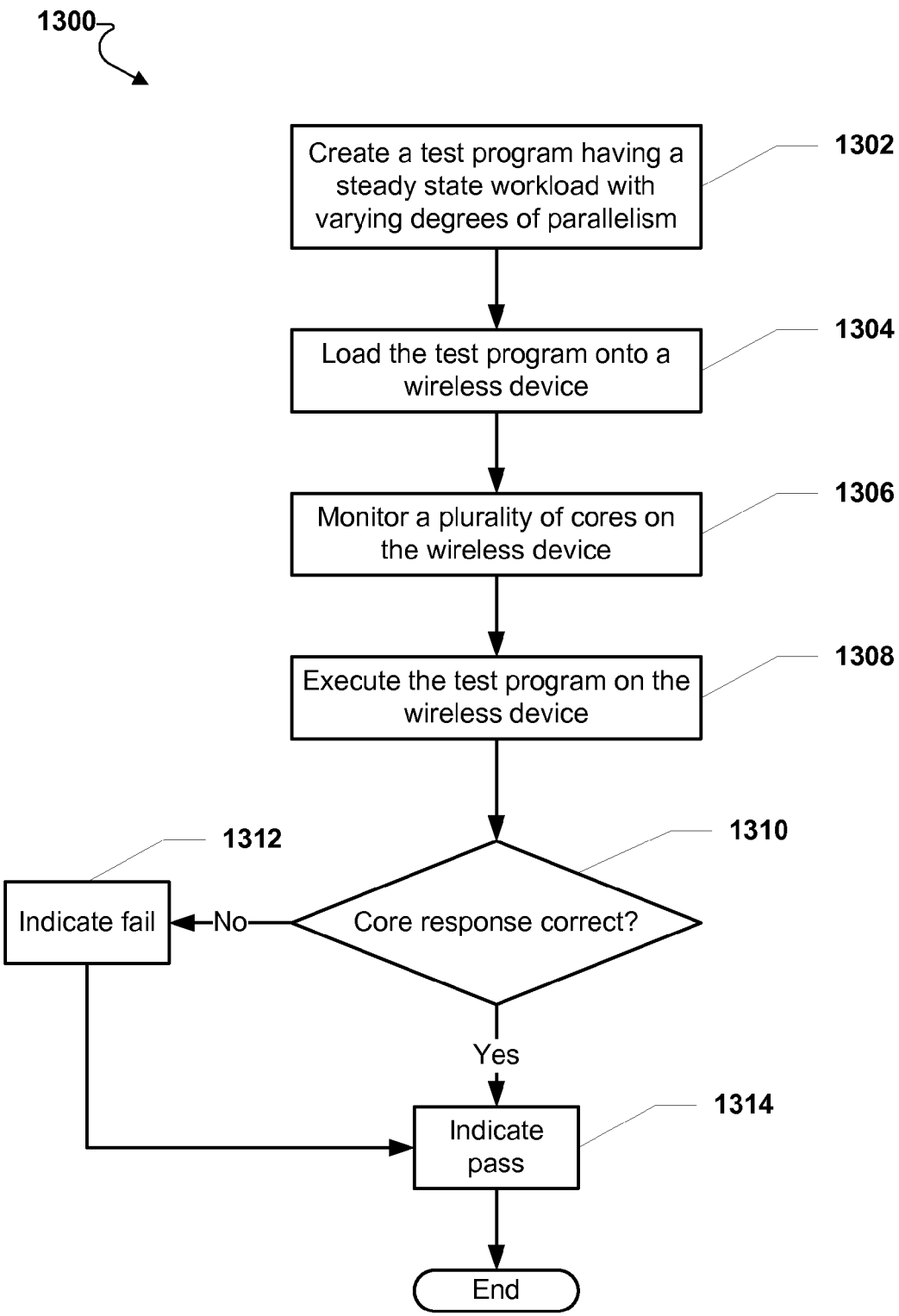
FIG. 13 is a flowchart illustrating a method of testing a multicore CPU.

Referring now to FIG. 13, a method of testing a multicore processor is shown and is generally designated 1300. As shown, the method 1300 may begin at block 1302 where a test program may be created. The test program may include a steady state workload with varying degrees of parallelism which would cause a plurality of cores to power up and down depending on the degree of parallelism, as described herein.

Moving to block 1304, the test program may be loaded onto a wireless device which includes a multicore processor. At block 1306, a plurality of cores may be monitored on the wireless device. For example, the core up/down state for each core may be monitored. The up/down state may be monitored by monitoring the power on each core, by monitoring the total power consumed, the speed at which workloads are completed, or a combination thereof.

At block 1308, the test program may be executed at the wireless device. Moreover, at decision 1310, it may be determined whether the cores within the wireless device respond correctly to the execution of the test program. In other words, it may be determined whether the cores are powering up and/or down correctly in response to the execution of the test program. At decision 1310, if the cores do not respond correctly to the execution of the test program, the method 1300 may move to block 1312 and a fail result may be indicated. The method 1300 may then end.

At decision 1310, if the cores do respond correctly to the execution of the test program, the method may proceed to block 1314 and a pass result may be indicated. Thereafter, the method 1300 may end.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

In a particular aspect, the system and methods described herein may dynamically infer the degree of workload parallelism by monitoring the utilization of virtual CPUs in a virtualized system. With CPU virtualization, certain software requirements may be eliminated from the high level operating system (HLOS) and transferred to the hypervisor. As such, a single hypervisor and MP-DCVS design can theoretically work consistently across varied HLOSs. In a particular aspect, the MP-DCVS software may be part of the hypervisor or it may have a privileged interface to the hypervisor.

In a virtualized system, hardware CPU resources may be abstracted as virtual CPUs. A single hardware CPU may be presented as one or more multiple virtual CPUs to the operating system. Using this capability, for a two hardware (i.e., physical) core system, two virtual cores may be presented the operating system, regardless of how many physical cores are actually powered up. The HLOS may run as if it were always on a multiprocessor (MP) system, and the HLOS may schedule tasks to one or both virtual CPUs.

The parallelism monitor MP-DCVS component of the hypervisor may monitor the HLOS usage of the two virtual CPUs, indicating the level of parallelism in the workload. In one aspect, the degree of parallelism is simply the sum of the utilizations of the two virtual CPUs. Utilization on each virtual CPU is the number of active virtual CPU cycles divided by the number of total virtual CPU cycles. Active virtual cycles are cycles during which the virtual CPU is not idled or is not running the OS idle task.

In a fully-virtualized system, entry of a virtual CPU into an idle state can be detected by the hypervisor intercepting instructions such as the ARM instructions WFI or WFE (wait for interrupt or wait for event). These instructions are typically invoked by the idle tasks of operating systems. Because they affect real hardware resources, these instructions may cause hypervisor entry on a fully virtualized system.

In a para-virtualized system, the operating system may directly invoke hypervisor calls to indicate an idle situation via special instructions (such as SVC, supervisor call) in lieu of attempting to directly execute WFI/WFE. In this aspect, the hypervisor need not intercept the WFI/WFE attempts and is directly notified of an idle situation.

The system and methods disclosed herein may monitor the sum of the virtual CPU utilization. In one aspect, the parallelism monitor may sample the virtual CPU utilization on a periodic basis, such as every one millisecond. In another aspect, the parallelism monitor may receive a callback from the hypervisor whenever a virtual CPU enters or exits idle state. In both cases, the parallelism monitor accumulates the instantaneous readings into a running average of the degree of parallelism in the workload.

A multiprocessor controller, disclosed herein, may decide how many physical cores to power based on the degree of parallelism in the virtual cores. In one aspect for a dual-core system, the following decision parameters may be applied by the multiprocessor controller: a wake threshold for the average parallelism, $N_w$; a time duration for which the $N_w$ threshold has been exceeded before the second core is woken up, $T_w$; a sleep threshold for the average parallelism, $N_s$; and a time duration for which the $N_s$ threshold must be exceeded before the second core is put to sleep, $T_s$.

When running non-parallel workloads, the HLOS may not be able to keep both virtual CPUs at more than 0.5 utilization. Accordingly, this will show as a degree of parallelism of at most 0.5+0.5=1 over any monitor period. Under these circumstances, if the value is <Ns for period> Ts, the multiprocessor controller may power collapse a second core.

When running truly parallel workloads, the HLOS will be able to keep both virtual CPUs busy at more than 0.5 utilization. Again, the sum of the utilization values indicates the average level of parallelism over any monitoring period. Under these circumstances, if the value is >Nw for period> Tw, MP-DCVS may power restore the second core.

The system and methods disclosed herein may be extended to support parallelism from multiple operating systems/environments simultaneously. In that case, for an N-core hardware system, every running operating environment is presented with N virtual CPUs. Assuming there are M operating systems/environments running, then M*N virtual CPUs may be instantiated. To calculate the degree of parallelism, the parallelism monitor sums the total utilization of all the M*N virtual CPUs across the multiple operating systems.

In another aspect, the system and methods described herein may be used to dynamically control multiple processors, multicore processors, multiple multicore processors, or any combination thereof. Moreover, the system and methods described herein may be used to dynamically control any number of processors, or multicore processors. In one aspect, a number of virtual cores presented to each operating system may be equal to a number of physical cores accessible to the operating system. In another aspect, the number of virtual cores presented to each operating system may be less than a number of physical cores accessible to the operating system. Moreover, in yet another aspect, the number of virtual cores presented to each operating system may be greater than a number of physical cores accessible to the operating system. Further, the system and methods described herein may be used to power multiple cores, or processors, on and off based on a total system load, e.g., a degree of parallelism. For example, in a four core system, the workload may suddenly drop and three cores may be powered off simultaneously.

The methods disclosed herein do not require any modifications of the applications or the operating systems running those applications and methods disclosed herein may be applied across multiple operating systems. Further, the methods disclosed herein may not be entangled with operating system code, including potential open source code. Further, the methods disclosed herein may discover and exploit parallelism across multiple simultaneous operating systems or environments. The methods disclosed herein may be considered agnostic whether parallelism is found at the thread-level within a single OS, at the process-level within a single OS, or at the thread- or process-level across multiple OSs.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of dynamically controlling power within a multicore central processing unit (CPU) in a wireless device, the method comprising:
   executing a plurality of virtual cores on at least one physical core of the multicore CPU;
   executing one or more tasks, one or more threads, or a combination thereof in at least one of the plurality of virtual cores;
   receiving a value indicative of a degree of parallelism in a workload on the plurality of virtual cores, wherein the value indicative of the degree of parallelism includes a total number of tasks and threads in ready-to-run queues of an operating system (OS) of the multicore CPU;
   determining whether the value indicative of the degree of parallelism in the workload on the plurality of virtual cores is greater than or equal to a first wake condition; and
   controlling power within the multicore CPU based at least upon determining that the value indicative of the degree of parallelism in the workload on the plurality of virtual cores is greater than or equal to the first wake condition.

2. The method of claim 1, further comprising:
   determining a time duration for which the first wake condition is met when the value indicative of the degree of parallelism in the workload on the plurality of virtual cores is greater than or equal to the first wake condition; and
   determining whether the time duration is equal to a first confirm wake condition.

3. The method of claim 2, further comprising:
   powering up a first physical core when the time duration is equal to the first confirm wake condition; and
   physically executing one or more tasks, one or more threads, or a combination thereof at a zeroth physical core and the first physical core.

4. The method of claim 3,
   wherein the value indicative of the degree of parallelism in the workload on the plurality of virtual cores further includes a total number of tasks and threads running in the plurality of virtual cores.

5. The method of claim 4, further comprising:
   determining whether the value indicative of the degree of parallelism in the workload on the plurality of virtual cores is less than or equal to a first sleep condition.

6. The method of claim 5, further comprising:
   determining a second time duration for which the first sleep condition is met when the value indicative of the degree of parallelism in the workload on the plurality of virtual cores is less than or equal to the first sleep condition.

7. The method of claim 6, further comprising:
   determining whether the second time duration for which the first sleep condition is met is equal to a first confirm sleep condition.

8. The method of claim 7, further comprising:
   powering down the first physical core when the second time duration for which the first sleep condition is met is equal to the first confirm sleep condition.

9. A wireless device, comprising:
   means for executing a plurality of virtual cores on at least one physical core of a multicore central processing unit (CPU) of the wireless device;
   means for executing one or more tasks, one or more threads, or a combination thereof in at least one of the plurality of virtual cores;
   means for receiving a value indicative of a degree of parallelism in a workload on the plurality of virtual cores, wherein the value indicative of the degree of parallelism includes a total number of tasks and threads in ready-to-run queues of an operating system (OS) of the multicore CPU;
   means for determining whether the value indicative of the degree of parallelism in the workload on the plurality of virtual cores is greater than or equal to a first wake condition; and
   means for controlling power within the multicore CPU based at least upon determining that the value indicative of the degree of parallelism in the workload on the plurality of virtual cores is greater than or equal to a first wake condition.

10. The wireless device of claim 9, further comprising:
means for determining a time duration for which the first wake condition is met when the value indicative of the degree of parallelism in the workload on the plurality of virtual cores is greater than or equal to the first wake condition; and
means for determining whether the time duration is equal to a first confirm wake condition.

11. The wireless device of claim 10, further comprising:
means for powering up a first physical core when the time duration is equal to the first confirm wake condition; and
means for physically executing one or more tasks, one or more threads, or a combination thereof at a zeroth physical core and the first physical core.

12. The wireless device of claim 11,
wherein the value indicative of the degree of parallelism in the workload on the plurality of virtual cores further includes a total number of tasks and threads running in the plurality of virtual cores.

13. The wireless device of claim 12, further comprising:
means for determining whether the value indicative of the degree of parallelism in the workload on the plurality of virtual cores is less than or equal to a first sleep condition.

14. The wireless device of claim 13, further comprising:
means for determining a second time duration for which the first sleep condition is met when the value indicative of the degree of parallelism in the workload on the plurality of virtual cores is less than or equal to the first sleep condition.

15. The wireless device of claim 14, further comprising:
means for determining whether the second time duration for which the first sleep condition is met is equal to a first confirm sleep condition.

16. The wireless device of claim 15, further comprising:
means for powering down the first physical core when the second time duration for which the first sleep condition is met is equal to the first confirm sleep condition.

17. A wireless device, comprising:
a processor, wherein the processor is configured with processor-executable instructions to perform operations comprising:
executing a plurality of virtual cores on at least one physical core of a multicore central processing unit (CPU) of the wireless device;
executing one or more tasks, one or more threads, or a combination thereof in at least one of the plurality of virtual cores;
receiving a value indicative of a degree of parallelism in a workload on the plurality of virtual cores, wherein the value indicative of the degree of parallelism includes a total number of tasks and threads in ready-to-run queues of an operating system (OS) of the multicore CPU;
determining whether the value indicative of the degree of parallelism in the workload on the plurality of virtual cores is greater than or equal to a first wake condition; and
controlling power within the multicore CPU based at least upon determining that the value indicative of the degree of parallelism in the workload on the virtual cores is greater than or equal to a first wake condition.

18. The wireless device of claim 17, wherein the processor is further configured with processor-executable instructions to perform operations comprising:
determining a time duration for which the first wake condition is met when the value indicative of the degree of parallelism in the workload on the plurality of virtual cores is greater than or equal to the first wake condition; and
determining whether the time duration is equal to a first confirm wake condition.

19. The wireless device of claim 18, wherein the processor is further configured with processor-executable instructions to perform operations comprising:
powering up a first physical core when the time duration is equal to the first confirm wake condition; and
physically executing one or more tasks, one or more threads, or a combination thereof at a zeroth physical core and the first physical core.

20. The wireless device of claim 19, wherein the processor is further operable to configured with processor-executable instructions to perform operations such that the value indicative of the degree of parallelism in the workload on the virtual cores further includes a total number of tasks and threads running in the plurality of virtual cores.

21. The wireless device of claim 20, wherein the processor is further configured with processor-executable instructions to perform operations comprising:
determining whether the value indicative of the degree of parallelism in the workload on the plurality of virtual cores is less than or equal to a first sleep condition.

22. The wireless device of claim 21, wherein the processor is further configured with processor-executable instructions to perform operations comprising:
determining a second time duration for which the first sleep condition is met when the value indicative of the degree of parallelism in the workload on the virtual cores is less than or equal to the first sleep condition.

23. The wireless device of claim 22, wherein the processor is further configured with processor-executable instructions to perform operations comprising:
determining whether the second time duration for which the first sleep condition is met is equal to a first confirm sleep condition.

24. The wireless device of claim 23, wherein the processor is further configured with processor-executable instructions to perform operations comprising:
powering down the first physical core when the second time duration for which the first sleep condition is met is equal to the first confirm sleep condition.

25. A non-transitory computer-readable storage medium having stored thereon computer-executable instructions configured to cause a processor to perform operations comprising:
executing a plurality of virtual cores on at least one physical core of a multicore central processing unit (CPU) in a wireless device;
executing one or more tasks, one or more threads, or a combination thereof in at least one of the plurality of virtual cores;
receiving a value indicative of a degree of parallelism in a workload on the plurality of virtual cores, wherein the value indicative of the degree of parallelism includes a total number of tasks and threads in ready-to-run queues of an operating system (OS) of the multicore CPU;
determining whether the value indicative of the degree of parallelism in the workload on the plurality of virtual cores is greater than or equal to a first wake condition; and
controlling power within the multicore CPU based at least upon determining that the value indicative of the degree of parallelism in the workload of the plurality of virtual cores is greater than or equal to a first wake condition.

26. The non-transitory computer-readable storage medium of claim 25, wherein the stored computer-executable instructions are configured to cause processor to perform operations further comprising:

determining a time duration for which the first wake is met when the value indicative of the degree of parallelism in the workload on the plurality of virtual cores is greater than or equal to the first wake condition; and determining whether the time duration is equal to a first confirm wake condition.

27. The non-transitory computer-readable storage medium of claim 26, wherein the stored computer-executable instructions are configured to cause the processor to perform operations further comprising:

powering up a first physical core when the time duration is equal to the first confirm wake condition; and physically executing one or more tasks, one or more threads, or a combination thereof at a zeroth physical core and the first physical core.

28. The non-transitory computer-readable storage medium of claim 27, wherein the stored computer-executable instructions are configured to cause the processor to perform operations such that the value indicative of the degree of parallelism in a workload on the plurality of virtual cores further includes a total number of tasks and threads running in the plurality of virtual cores.

29. The non-transitory computer-readable storage medium of claim 28, wherein the stored computer-executable instructions are configured to cause the processor to perform operations further comprising:

determining whether the value indicative of the degree of parallelism in the workload on the plurality of virtual cores is less than or equal to a first sleep condition.

30. The non-transitory computer-readable storage medium of claim 29, wherein the stored computer-executable instructions are configured to cause the processor to perform operations further comprising:

determining a second time duration for which the first sleep condition is met when the value indicative of the degree of parallelism in the workload on the plurality of virtual cores is less than or equal to the first sleep condition.

31. The non-transitory computer-readable storage medium of claim 30, wherein the stored computer-executable instructions are configured to cause the processor to perform operations further comprising:

determining whether the second time duration for which the first sleep condition is met is equal to a first confirm sleep condition.

32. The non-transitory computer-readable storage medium of claim 31, wherein the stored computer-executable instructions are configured to cause the processor to perform operations further comprising:

powering down the first physical core when the second time duration for which the first sleep condition is met is equal to the first confirm sleep condition.

* * * * *